Figure 1:
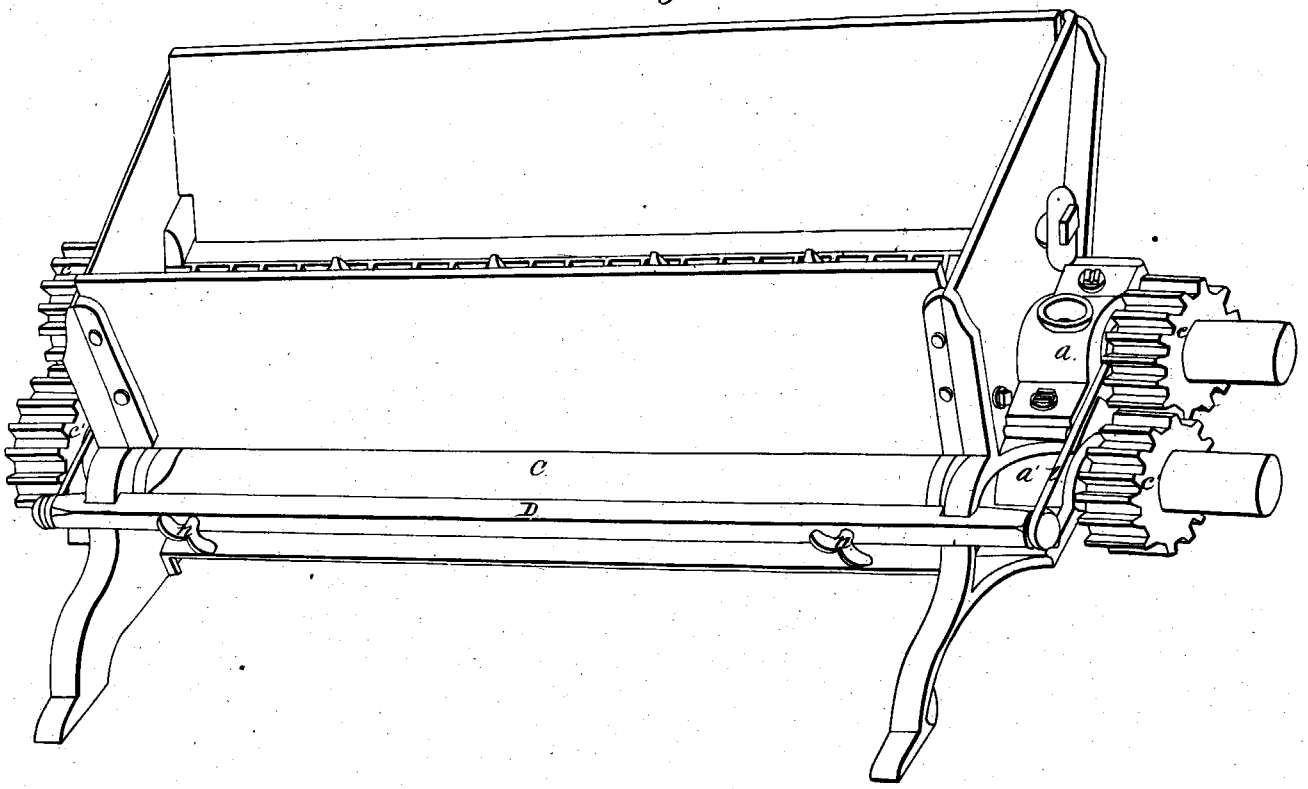

Bantz & Andrews. Sheet 1-2, Sheets.

Bark Mill.

No. 180. Reissued Oct. 15, 1850.

2 Sheets—Sheet 2.
BANTZ & ANDREWS.
Bark Mill.
No. 180.
Reissued Oct. 15, 1850.
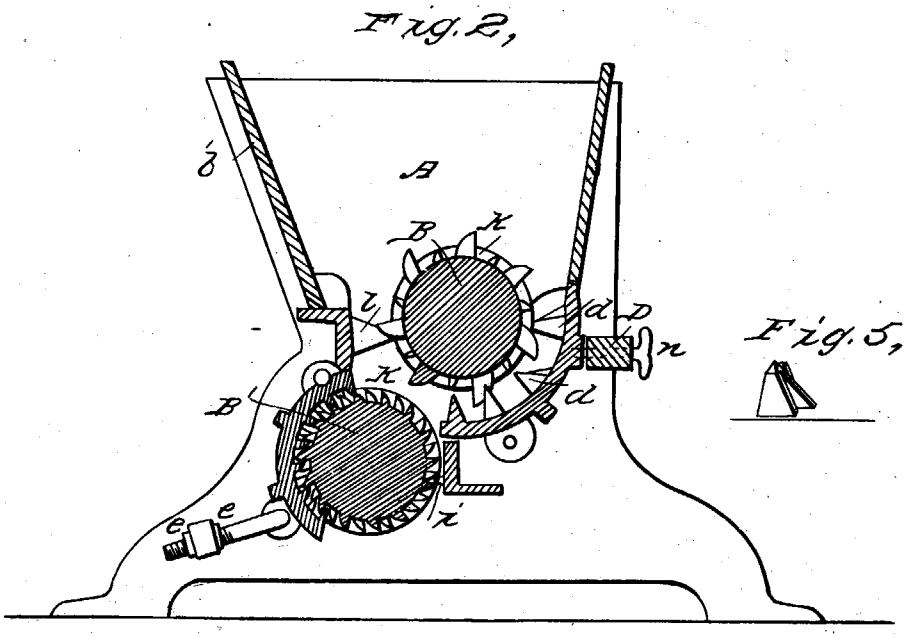
N. PETERS, Photo-Lithographer, Washington, D. C.

UNITED STATES PATENT OFFICE.

SIDNEY A. BANTZ AND WILLIAM ANDREWS, OF FREDERICK, MARYLAND.

MILL FOR GRINDING.

Specification forming part of Letters Patent No. 6,916, dated December 4, 1849; Reissued October 15, 1850, No. 180.

*To all whom it may concern:*

Be it known that we, SIDNEY A. BANTZ and WILLIAM ANDREWS, of Frederick, in the county of Frederick and State of Maryland, have invented a new and useful Improvement in Mills for Grinding Bark, Corn, and other Substances; and we do hereby declare that the following is a full, clear, and exact description of our invention and of the characteristics which distinguish it from all others heretofore known, reference being had to the accompanying drawings, which form part of this specification, and in which—

Figure 1 represents a perspective view of a bark mill, constructed according to the principles of our invention; Fig. 2, is a cross section of the same, and Fig. 3 a perspective view of one of the teeth of the concave.

Our invention consists, first, in giving a vibratory motion to the concave, so that it shall diverge from and close toward the cylinder, whereby a drawing motion is communicated to the teeth which thus cut as well as crush the bark; second in the peculiar form given to the teeth of the concave which increases their strength and enables them to act more effectually on the bark.

Our barkmill as represented in the accompanying drawing is composed of two toothed cylinders revolving horizontally above each other in opposite directions, and each furnished with a toothed concave corresponding in curvature with the rolls. The teeth of the two cylinders and their respective concaves are of different sizes to adapt them to the diminished size of the fragments of bark. A, A, are the end plates of the mill; they are constructed of cast iron and have the pillow blocks *a*, *a′* of the cylinders B B′, cast fast to them; they widen out above the pillow blocks to form the ends of the hopper into which the bark is thrown, and are connected with each other by the longitudinal sides *h*, *h*, of the hopper. The cylinders are furnished with hawk bill teeth, those of the upper cylinders are alternately coarse and fine, while the teeth of the lower cylinder are all fine. Each cylinder shaft has a toothed pinion *c*, *c*, *c′ c′*, secured to each of its extremities, these gear into each other and communicate motion from one cylinder to the other, the two thus revolving in opposite directions.

The concaves C, C′, are placed on those sides of the cylinder where the teeth in their revolution descend; the lower concave C′, is furnished with small teeth corresponding in size with those on its respective cylinder. The upper concave C is attached to the end plates A, A, of the mill by axes or centers *o* on which it can vibrate. An eccentric is secured to each extremity of the cylinder shaft between the cog-wheels *c*, *c*, and the end plates; these eccentrics are connected by rods *l*, *l*, with the extremities of a cross beam D, which is secured by set screws *n*, *n*, to the concave C; as then the cylinders revolve, the eccentrics will give a reciprocating motion to the cross beam and cause the concave C to vibrate on its centers. The concave is studded with teeth, *d*, a perspective view of one of which is shown at Fig. 3. It is obvious that the central rib not only adds greatly to the strength of the teeth but forms an additional edge which is of great advantage in severing the bark. The bark is thrown into the hopper and forced by the teeth of the upper cylinder between it and the vibrating concave by the teeth of which it is both cut and crushed into fragments. The coarsely crushed bark falling upon the moving surface of the upper cylinder, is carried between it and the lower toothed concave by which it is reduced to the requisite size. Each concave is adjustable, the upper by means of the set screws *n*, *n*, and the lower by means of set nuts *e e*, so that they can be set at a greater or less distance from the cylinder to regulate the size to which the bark is reduced. Each cylinder is provided with a wiper, consisting of a single row *i i*, of teeth attached to a bar opposite the ascending face of the cylinder, these teeth cleanse the teeth of the cylinders of adhering pieces of bark which would otherwise clog them and impede their action, the same result may be obtained by extending the concave until it nearly touches the cylinder, and cutting slots in it through which the teeth would pass. A collar K, K′, is secured to each extremity of each cylinder just inside of the end plates, these prevent the dust from entering between the brasses of the pillow blocks and clogging and cutting the journals.

In the ordinary cylinder bark mills the comminution of the bark is wholly performed by crushing it between the teeth of the cylinder and the corresponding teeth of a stationary concave which project toward the cylinder in almost radial lines. The crushing of the large slabs in this manner requires a great expenditure of power and the rubbing of the fragments causes the gum to exude and clog the mill. These disadvantages are obviated to a great extent by the substitution of the teeth *d*, *d*, and by giving them a drawing motion by which the slabs of bark are cut into coarse fragments which are quickly reduced to their proper size by the action of the lower cylinder and its concave.

The cylinder may have an oscillating motion toward and from the concave, given to it, and this would obviously be merely the converse of the before described arrangement, but in some cases this modification might be preferable. The oscillating motion may be communicated to the concave through the intervention of a lever, and the amount of this motion may be graduated by making the connection of the concave with the lever at a greater or less distance from its fulcrum, or the graduation may be effected by means of many other well known devices which would be readily suggested to any practical machinist.

Having thus described the construction and operation of our bark mill, what we claim therein as our invention and desire to secure by Letters Patent is—

The vibratory motion given to the concave, substantially in the manner herein set forth.

In testimony whereof we have hereunto subscribed our names.

SIDNEY A. BANTZ.
WILLIAM ANDREWS.

Witnesses:
LEWIS BRUNER,
CECILIUS HELD.

[FIRST PRINTED 1911.]